United States Patent
Courier de Méré

[11] Patent Number: 5,134,556
[45] Date of Patent: Jul. 28, 1992

[54] VOLTAGE CONVERTER WITH SELF-INTEGRATION AND VOLTAGE SUMMATION

[76] Inventor: Henri Courier de Méré, Les Berruries, Mettray, France

[21] Appl. No.: 601,845

[22] Filed: Oct. 23, 1990

[30] Foreign Application Priority Data

Jul. 23, 1990 [FR] France .................. 90 09585

[51] Int. Cl.⁵ .......................... H02M 5/458
[52] U.S. Cl. ........................ 363/37; 363/34; 363/39
[58] Field of Search .......... 363/34, 37, 39, 40, 363/45, 48, 126, 131, 133

[56] References Cited

U.S. PATENT DOCUMENTS

| | | | |
|---|---|---|---|
| 3,414,804 | 12/1968 | Reinert | 363/126 |
| 3,663,940 | 5/1972 | Schwarz | 363/45 |
| 3,978,388 | 8/1976 | de Vries | 363/45 |
| 4,109,307 | 8/1978 | Knoll | 363/101 |
| 4,222,096 | 9/1980 | Capewell | 363/126 |
| 4,369,490 | 1/1983 | Blum | 363/48 |
| 4,555,753 | 11/1985 | Takahashi | 363/126 |
| 4,642,745 | 2/1987 | Steigerwald et al. | 363/37 |
| 4,654,774 | 3/1987 | Lemmers | 363/48 |
| 4,884,180 | 11/1989 | Hoffmann | 363/101 |
| 4,930,061 | 5/1990 | Slack et al. | 363/48 |

Primary Examiner—Jeffrey Sterrett
Attorney, Agent, or Firm—Jenner & Block

[57] ABSTRACT

An electronic device which, fed from a sinusoidal or randomly variable network, makes it possible to supply the input of a converter with which it is equipped with a DC voltage, a load connected at the output also being fed with a DC voltage envelope, whereas the power factor of the current taken from the mains is kept at unitary value and said current is the image of the voltage which produces it. The high frequency output circuit of the converter loads the series circuit formed by the load 13 associated with an impedance 16. The voltage developed across the terminals of the impedance 16 is rectified by a rectifier bridge 15 mounted in series with a mains rectifier bridge 10 so that these voltages, added to the input of the converter 12, affect the envelope of a DC voltage, this also resulting in supplying a DC voltage envelope to receiver the load 13. The current taken from the mains has a unitary power factor and is proportional to the input voltage. This device is applicable to the majority of electronic converters used as ballasts, transformers, stabilized power supplies, and so on.

9 Claims, 6 Drawing Sheets

VOLTAGE CONVERTER WITH SELF-INTEGRATION AND VOLTAGE SUMMATION

BACKGROUND OF THE INVENTION

The present invention relates to devices comprising an electronic energy converter which, fed from an AC distribution mains, may provide at its output a high frequency current whose readily adaptable potential is applicable to a majority of receivers, either directly or after previous rectification.

Known devices of this kind are numerous and could be classed in the two following types:

the first one, illustrated in the accompanying FIG. 1, comprises a high frequency converter 5 whose DC input is shunted by the electrolytic smoothing capacitor 4, which is charged by the mains rectifier bridge 3 whose AC input is connected to the mains terminals 1a and 1b through the low pass filter 2 characterized by its considerable ferromagnetic inductance associated with capacities of values which are often high:the purpose of this filter is to limit the harmonic currents caused by charging of the smoothing capacitor 4 to the peak voltage of the mains, as well as to bring the shape factor of the current taken from the mains and the power factor of the device down to standardized values, whereby the voltage present between the input terminals of the converter 5 only has low residual modulation, which thus results in the fact that between its output terminals 6a and 6b the envelope of the high frequency AC voltage is only weakly modulated by the low frequency component of the rectified mains, thus lending itself to numerous applications, with or without rectification of the high frequency current;

the second one, illustrated in the accompanying FIG. 2, still comprises a converter 5 but the input thereof is now only shunted by a decoupling capacitor 6 for the high frequencies, which capacitor has a sufficiently small capacity for charging thereof by the mains rectifier bridge 3 not to create substantially harmonic currents on the current taken from the mains; thus, the voltage applied to converter 5, not being filtered by a high value capacitor, is modulated in accordance with the amplitude of the sinusoid of the mains, which results in equivalent modulation of the high frequency output current delivered by said converter; such a voltage envelope is satisfactory for few applications and thus, in most cases, it is necessary to rectify the high frequency current by means of the rectifier bridge 7 whose output current is filtered by the high value electrolytic capacitor 8, thus permitting a load applied between terminals 9a and 9b to be fed with substantially DC voltage.

Other devices have been envisaged, namely, the use of a complementary converter for charging said capacitor 4 with a good shape factor of the current taken from the mains, without having recourse to the bulky antiharmonic filter 2.

Such devices have serious drawbacks, which are enumerated below.

In devices of the first type, which are the most widespread, filter 2, which is cumbersome and heavy, by its own losses greatly reduces the electric efficiency of the unit while providing a suitable function only over a very reduced input voltage and frequency range; furthermore, for numerous applications, the long term reliability of the electrolytic capacitor 4 is unacceptable; this therefore restricts their field of application.

In devices of the second type, the supply current for converter 5, which is highly modulated, limits the electric efficiency which this latter might offer; moreover, the very high modulation of its high frequency output current renders it suitable for only a small number of applications if previous rectification is not provided by means of bridge 7 and filtering by means of the electrolytic capacitor 8 of a special and expensive type. Thus, with devices of this type a high frequency current only weakly modulated by the mains component cannot be delivered, which represents the majority of potential uses.

In so far as the devices using an auxiliary converter are concerned, the complexity of construction, the increase of high frequency parasite signals, control of the operation of the auxiliary converter and electric efficiency losses which it causes, have never made it possible to develop them industrially in a significant way.

Contrary to the known devices of the prior art, described above, the device of the invention completely overcomes all the above drawbacks, while only using a device of simple, economic and reliable construction.

SUMMARY OF THE INVENTION

The present invention comprises an electronic converter 12 adapted to deliver a high frequency unitary value signal to a series circuit comprising a load 13 and a capacitive impedance 16. The capacitive impedance 16 is connected in parallel with the AC input terminals of a rectifier means 15. The DC output terminals of the rectifier means 15, decoupled by a capacitor 14, are connected in series with the DC output terminals of a mains rectifier means 10. The AC input terminals of the mains rectifier means 10 are connected to a mains voltage. After rectification, the mains voltage is added to the voltage taken between the terminals of the capacitive impedance 16. A capacitor 11 integrates the voltage sum, while insuring decoupling of the DC input terminals of the converter 12. The substantial DC voltage developed at the terminals of the capacitor 11 is applied to the input terminals of the converter 12.

DESCRIPTION OF THE PREFERRED EMBODIMENTS

Figure 3:
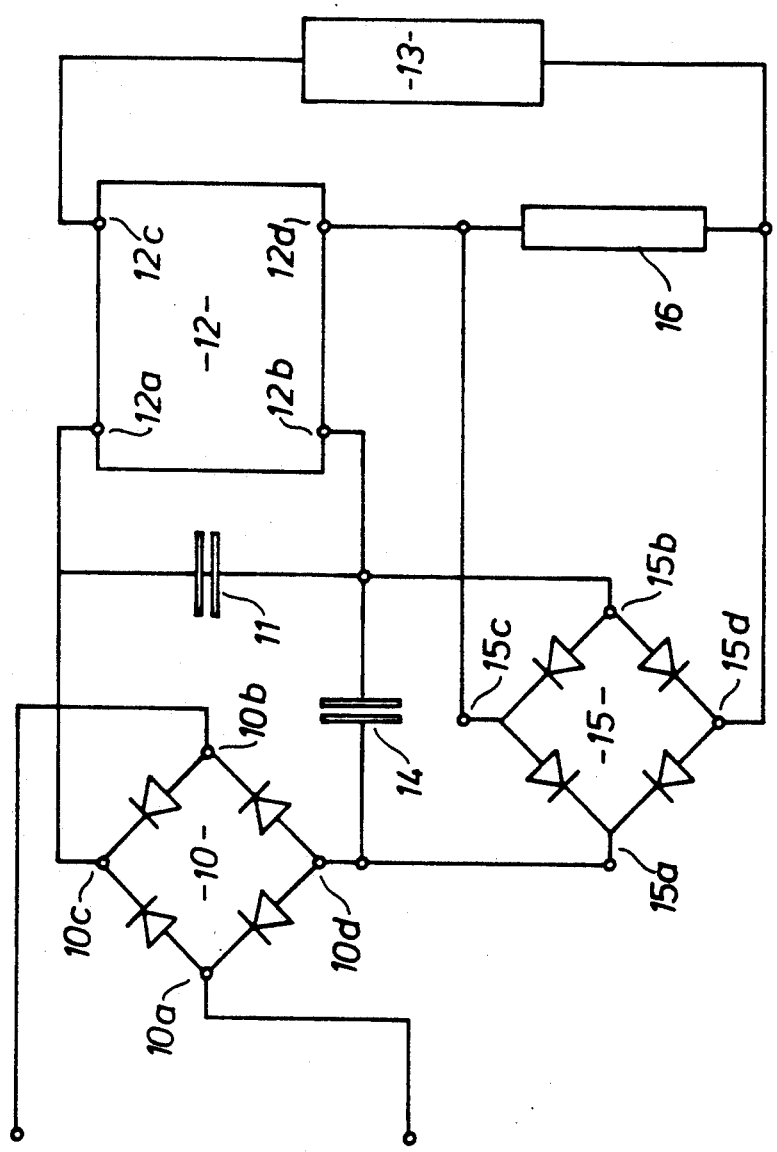
FIG. 3 is a circuit diagram of the preferred embodiment of the present invention.

In a general embodiment illustrated in the accompanying FIG. 3, the device of the invention comprises a converter 12 whose high frequency output voltage, present between terminals 12c and 12d, is applied to the series circuit comprising receiver or tool 13 and capacitive impedance of suitable value 16; the AC input terminals 15c and 15d of the rectifier means 15 are connected to the terminals of said impedance 16, the voltage thus rectified, present between terminals 15a and 15b, is filtered by the low value capacitor 14 to be applied, on the one hand, to one of the common DC input terminals of converter 12 and on the other hand to one of the suitably oriented DC input terminals of the mains rectifier means 10 whose other DC input terminal is connected to the other of the common AC input terminals of converter 12, so that the high frequency voltage taken between the terminals of impedance 16 is added-/integrated in series to the rectified mains voltage; a capacitor 11, of noncritical value, integrates the voltage sum thus provided, while ensuring decoupling of the input terminals 12a and 12b of said converter 12.

Figure 1:
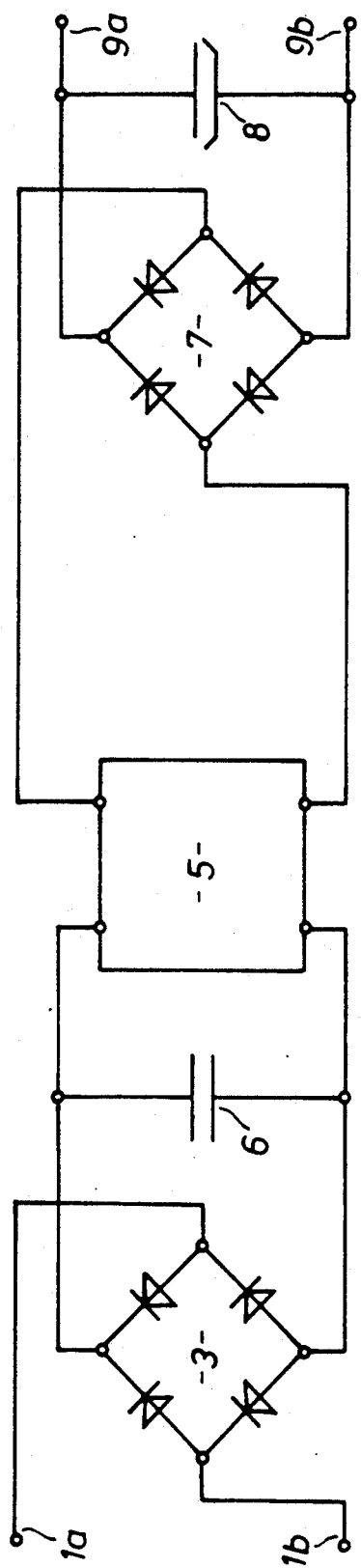
FIG. 1 is a circuit diagram showing a prior art voltage converter.
Figure 2:
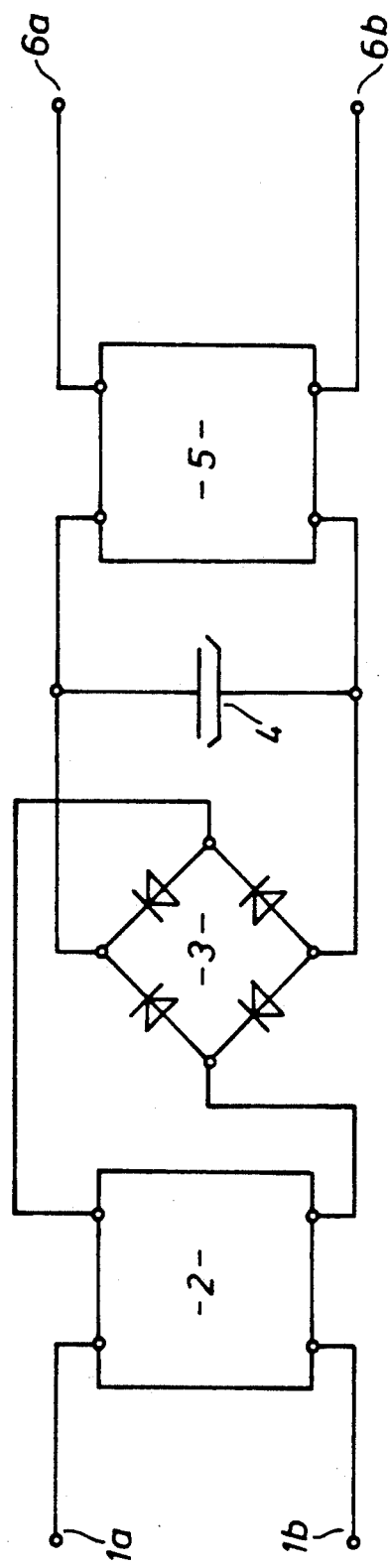
FIG. 2 is a circuit diagram showing another prior art voltage converter.
Figure 4:
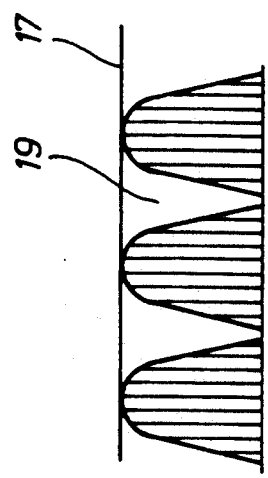
FIG. 4 is a waveform diagram of the voltage envelope present between the DC output terminals of the rectifier means 15 of the preferred embodiment.
Figure 5:
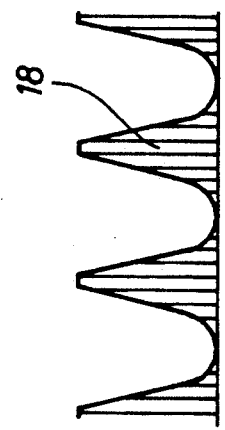
FIG. 5 is a waveform diagram of the voltage envelope present between the DC output terminals of the mains rectifier means 10 of the preferred embodiment.

Under these conditions, if the impedance has a suitable reaction to the passage of the current flowing through receiver or load 13, the voltage recorded between the DC terminals 15a and 15b of the rectifier means 15 have the voltage envelope illustrated in the accompanying FIG. 5. Furthermore, the voltage of the mains applied between terminals 10a and 10b of the rectifier means 10, after rectification, presents between terminals 10c and 10d the voltage envelope illustrated in the accompanying FIG. 4.

Under these conditions, it can be seen that the integration /addition of these two voltages, suitably biased and of closely related maximum amplitude, after integration between the terminals of capacitor 11 will make it possible to obtain a resultant voltage close to the DC envelope 17. In fact, the synchronization of said voltages being provided by the period of the mains itself, it can be seen that the transfer of the hatched area 18 may take place on the empty area 19, their areas being substantially the same.

Such voltage summation is then integrated between the terminals of capacitor 11 which must only have a relatively small capacity, compatible with all the types of capacitors of restricted dimensions, whether they are of electrolytic or plastic film type.

Thus, the high frequency energy taken at the output of converter 12, via impedance 16, makes it possible to supply said converter with a substantially DC voltage, while exactly compensating for the current taken from the mains which remains perfectly sinusoidal.

Consequently, the voltage envelope applied to receiver or load 13 remains practically without mains modulation whereas converter 12 operates under excellent conditions of efficiency.

To complete the device, a filter against high frequency parasites should be provided between the mains and terminals 10a and 10b.

It is obvious that the high frequency AC voltage thus applied between the terminals of receiver or load 13 could be previously rectified and filtered so as to feed the latter with DC voltage.

Such as it has just been described, the device of the invention overcomes the drawbacks inherent in the prior art devices. In fact, from the distribution mains it only takes a substantially sinusoidal current, in phase with the voltage, to deliver to receiver or load 13 a voltage whose envelope is substantially DC, to allow the converter fed with DC current to offer the maximum electric efficiency compatible with the standard components available on the market, and to ensure excellent regulation, as a function of the variations of the mains voltage, of the current passing through the load 13 while eliminating the bulky and unreliable electrolytic capacitors in applications requiring the best MTBF.

Figure 6:
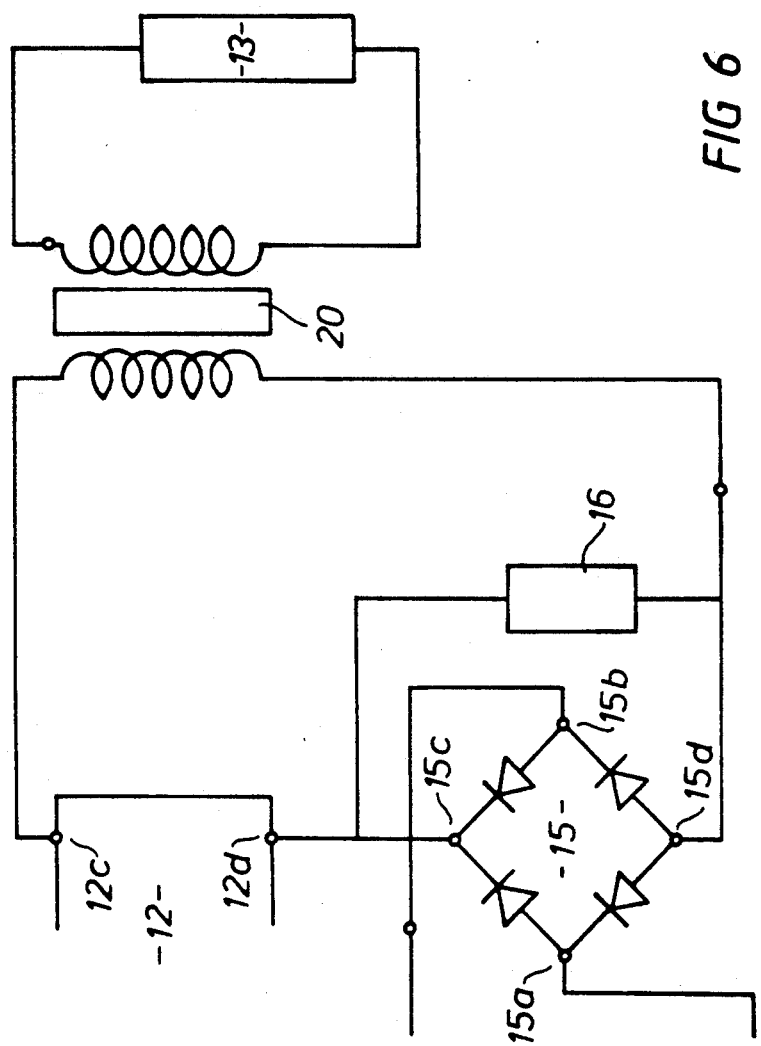
FIG. 6 is a circuit diagram of a second embodiment of the present invention.

According to the embodiment of the device of the invention illustrated in the accompanying FIG. 6, the transfer of the high frequency current to load 13 takes place via the transformer 20 whose primary and inductance are mounted respectively in series and connected between the output terminals 12c and 12d of converter 12, the secondary of said transformer charging receiver or load 13, the general operation being moreover as described above.

Figure 7:
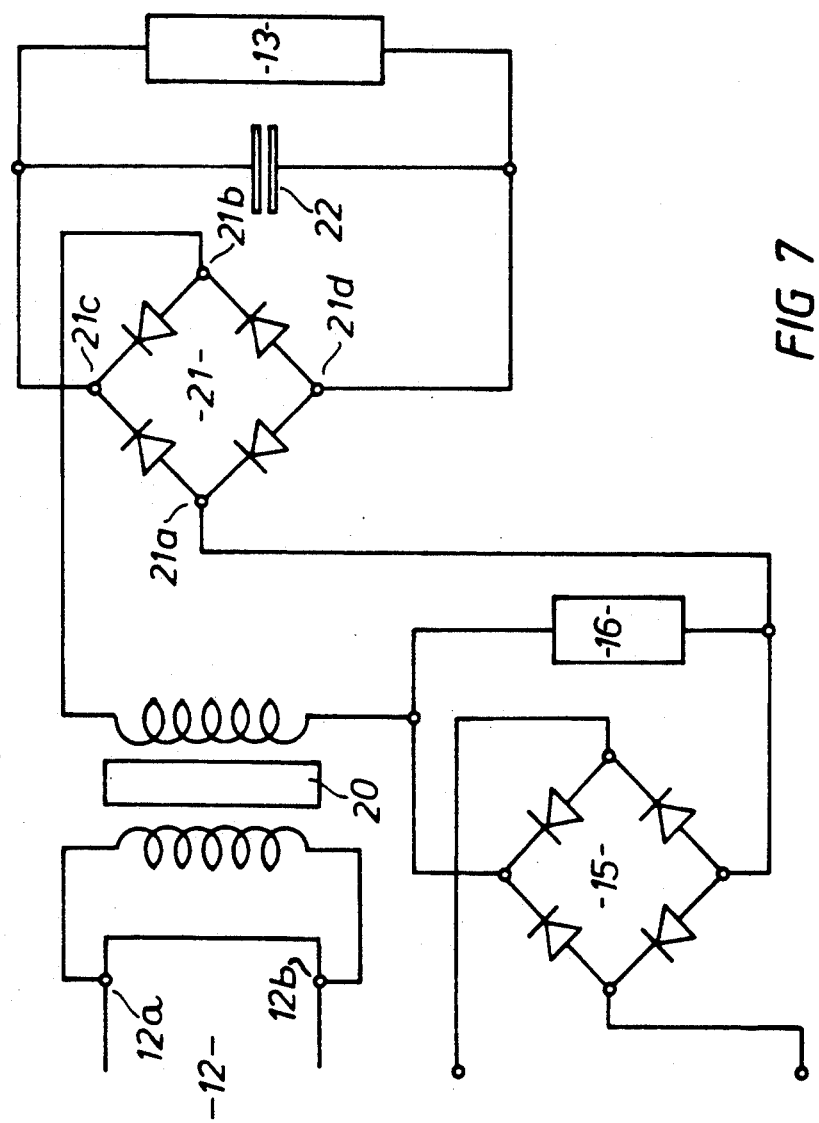
FIG. 7 is a circuit diagram of a third embodiment of the present invention.

In the embodiment of the device of the invention illustrated in the accompanying FIG. 7, the primary of transformer 20 is connected directly to the output terminals 12c and 12d of converter 12 and it is its secondary, mounted in series with impedance 16, as well as with the Ac input terminals 21a and 21b of the rectifier means 21, which will deliver the voltage to be applied to the rectifier means 15. In this case, it is obvious that the relative direction of this winding should be suitably chosen, as well as the absolute value of impedance 16 which will be calculated proportionally to the transformation ratio of said transformer, if the latter is a voltage booster, and inversely proportional if it is a step-down transformer. The purpose of the low value capacitor 22, connected in parallel with the DC output terminals 21c and 21d of the rectifier means 21, is to eliminate the high frequency residual and allow a DC current to be applied between the terminals of receiver or load 13.

The last two embodiments of the device are particularly well adapted to the construction of high frequency or DC supply transformers. In fact, over the prior art they have either the advantage of not requiring the use of a mains filter 2 whose losses and volume are often equivalent to the ferromagnetic transformer which they might replace or the advantage of offering a constant output voltage envelope, which very considerably reduces the high frequency rectification losses and the filtering losses. Thus, at the present time, to obtain a compact power supply, an electronic transformer must be used whose peak output voltage is frequently twice the effective voltage applied to the receiver or load, this being due to the addition of parasites to the sector modulation. Under such conditions, with high output current, the losses may be reasonably assessed as follows : 10% for the converter, 10% for the high frequency rectification and 15% for smoothing by the electrolytic output capacitor; this, under ideal temperature conditions, leads to a maximum efficiency of 68.85%.

In the case of a device constructed according to the present invention, under the same conditions, the losses are the following : 10% for the converter, 5% for the high frequency rectification and 0% for smoothing, which leads to a maximum efficiency of 85.5%. Moreover, since the latter device only uses plastic film capacitors whose loss angle tangent is less than 15/10000° over a temperature range from −40° C. to +85° C., apparatus may be constructed whose bulk is reduced by 50% in the case of low power applications.

Figure 8:
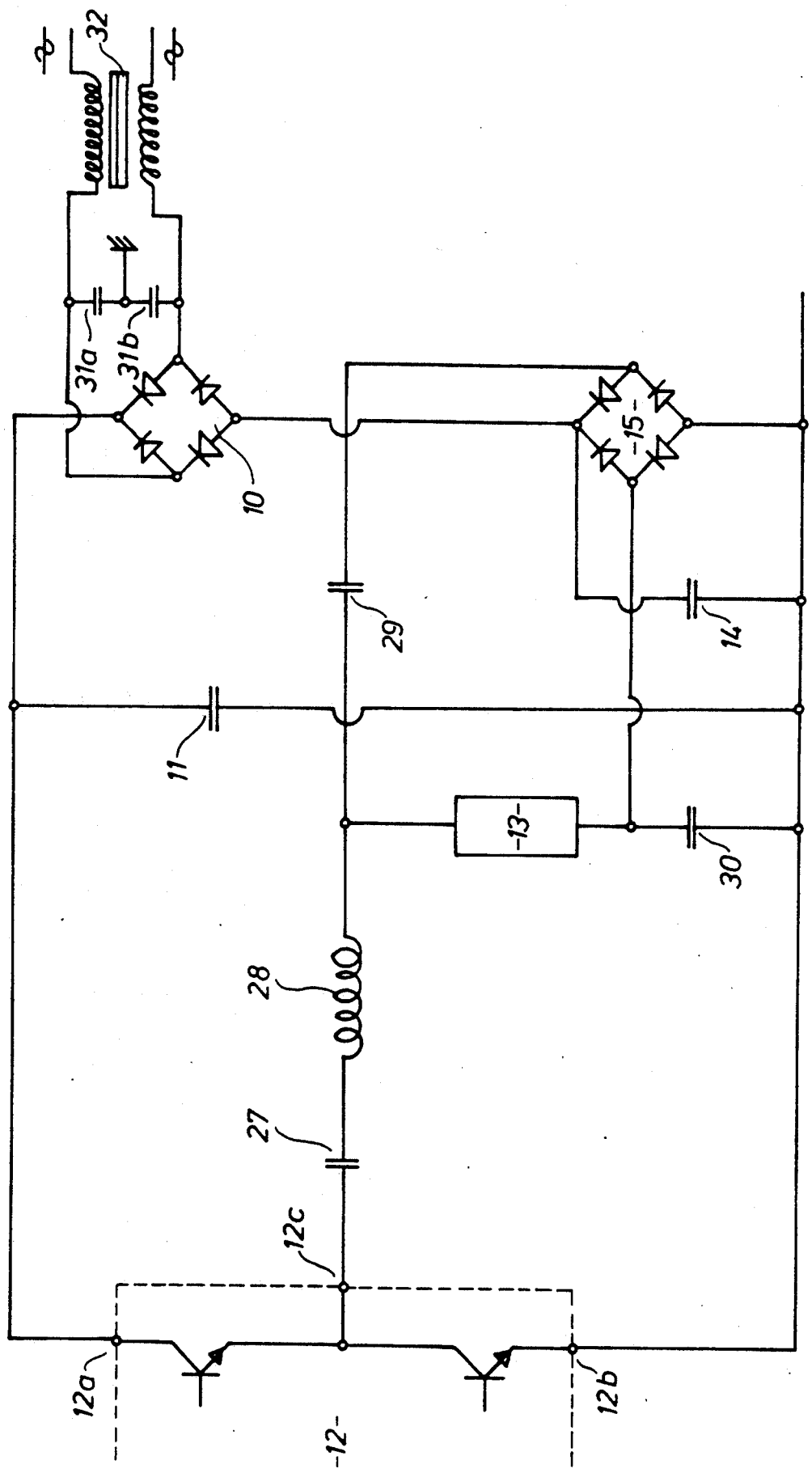
FIG. 8 is a circuit diagram of a fourth embodiment of the present invention.

The accompanying FIG. 8 illustrates a practical application of the device of the invention. In this variant, said high frequency converter 12 is of the "semibridge" type equipped with switching means 23a and 23b, the output of the converted energy taking place between terminal 12c common to said switching means and one of the DC input terminals 12a and 12b of converter 12, which are shunted by the high frequency decoupling capacitor 11. A DC isolation capacitor 27 transmits the high frequency current to the series circuit formed by the limiting inductance 28, receiver or load 13 and capacitor 30 which plays the role of recovery impedance 16 described above.

When this series circuit has a given high frequency current flowing therethrough, this current limited by inductance 28 meets the reactance of capacitor 30 of defined value. This reactance develops between the terminals of the latter a voltage which, applied to one of the AC input terminals of the rectifier bridge 15 used as a voltage doubler, will be rectified and filtered by the decoupling capacitor 14 between the DC output terminals of said bridge. This rectifier bridge 15 has DC output terminals connected in series with the DC output terminals of the mains rectifier 10, themselves suitably oriented. Thus, the mains current applied between the Ac input terminals of the rectifier bridge 10 will have added thereto, after rectification and filtering, the voltage taken between the terminals of capacitor 30. The sum of these voltages is integrated between terminals 12a and 12b of capacitor 11, which are common to the input of converter 12.

Accessorily, a capacitor 29 connected between the terminal of receiver 13 not common to capacitor 30 and the Ac input terminal of the rectifier bridge 15 which is not common with capacitor 30, is provided to improve the linearity of the voltage present at the terminals of capacitor 14, by adding the voltage developed between the terminals of the series circuit comprising the receiver or load 13 and the impedance of capacitor 30. In some cases, it may be advantageous to connect the terminal of capacitor 29, common to receiver or load 13, directly to the output 12c of converter 12.

In order to prevent return of high frequency parasites towards the mains, the low value bifilary inductance 32, in association with capacities 31a and 31b whose middle point is grounded, is inserted between said mains and the AC input terminals of the rectifier bridge 10.

Such as it has been described, the device of the invention provides self-smoothing of the modulation of the mains voltage between terminals 12a and 12b, and hence optimum efficiency operation of converter 12, as well as the application of a constant voltage envelope between the terminals of receiver or load 13. Under these conditions, the current taken from the mains remains substantially sinusoidal and perfectly in phase with the voltage : its power factor equal to unity is not affected by the variations of the input voltage nor by the variations of the mains frequency whether it is 50 or 60 Hz.

It is obvious that the embodiment of the device of the invention described above could accept other converter structures using all known types of switching means and not only the bipolar transistors shown here for the sake of convenience. Also, it is obvious that the receiver or load 13 could be preceded by a rectifier bridge and a decoupling capacitor so as to be fed with DC current.

Figure 9:
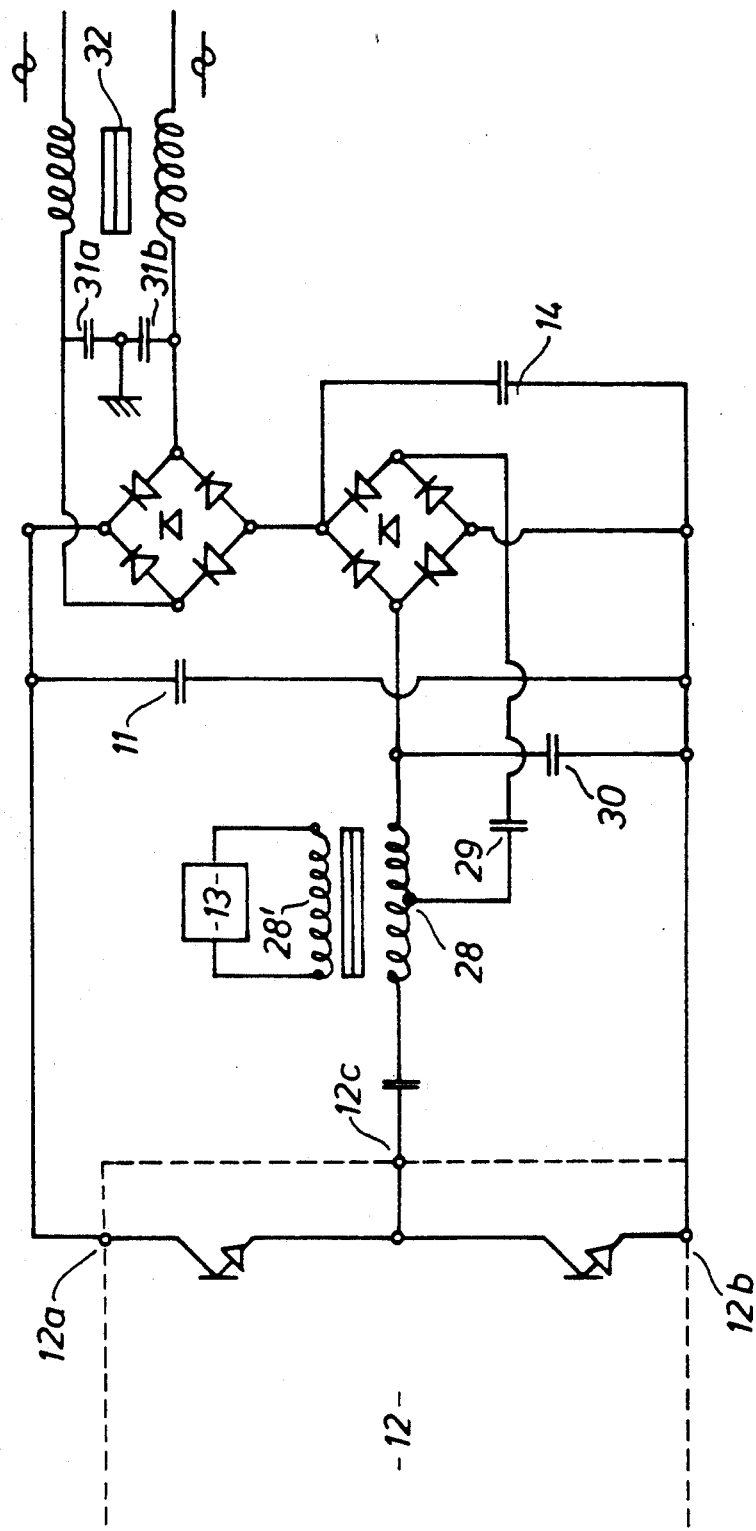
FIG. 9 is a circuit diagram of a fifth embodiment of the present invention.

A variant of the device of the invention described above is illustrated in the accompanying FIG. 9. In this embodiment, everything remains the same, except that receiver or load 13 is no longer connected in series with inductance 28 but is connected between the terminals of a secondary winding 28' coupled to said inductance 28, capacitor 29 having one of its terminals connected to an intermediate tapping belonging to inductance 28. Under these conditions, the operation remains identical to what has been described above.

Such an embodiment makes it possible to isolate the receiver or load 13 galvanically from the mains.

All the above described devices are adapted to operate from a sinusoidal current distribution mains, but also from current coming from a source delivering a voltage whose envelope is randomly variable. Under these conditions, the current taken by the device for its power supply will be the image of the supply voltage, in phase therewith, whereas the voltage at the input of the converter 12, like the voltage applied to the terminals of load 13, will be of a substantially constant amplitude.

The device of the invention may be used in association with most types of converter. This device makes it possible, from an AC or randomly variable voltage mains, to feed such a converter with a current without substantial residual ripple, and without altering the factor of the current taken from the mains nor its envelope which, over a wide frequency range, is maintained in the image of the voltage.

The device of the invention radically overcomes the defects of similar devices constructed according to the prior art. It may be used in all cases where it is desired to provide an economic DC power supply, an electronic transformer, an electronic ballast for fluorescent lamps, etc...

As is evident, and as it follows moreover from what has gone before, the invention is in no way limited to the modes of application and embodiment which have been more particularly considered; it includes, on the contrary, all variants thereof.

I claim:

1. An energy conversion device comprising an electronic converter adapted to deliver between its output terminals a high frequency unitary value signal whose envelope is influenced by the form of an input voltage, wherein the output terminals of the converter deliver a high frequency current to an output circuit and a capacitive impedance, the latter being connected in parallel with the AC input terminals of a first rectifier means whose, DC output terminals, decoupled by a first capacitor and suitably oriented, are connected in series with the DC output terminals of a second rectifier means whose AC input terminals are connected to a mains voltage, so that the mains voltage, after rectification, is added to the voltage taken between the terminals of the capacitive impedance, the sum of these voltages being integrated between the terminals of a second capacitor, developing between the terminals thereof a substantial DC voltage which is applied between the DC input terminals of the converter, the input terminals of the converter being decoupled by the second capacitor.

2. The device according to claim 1, wherein the output circuit comprises a load connected in series with an oscillator formed by a third capacitor and an inductor.

3. The device according to claim 1, wherein the output circuit comprises a transformer having a primary winding and a secondary winding, the primary winding being coupled to the output terminals of the converter, and the secondary winding being connected to the series circuit comprising the impedance and a load which is connected through a third rectifier means whose DC output terminals are decoupled by a third capacitor.

4. The device according to claim 1, wherein the output circuit comprises a third rectifier means having AC input terminals and DC output terminals, the DC output terminals being shunted by a third capacitor and connected in parallel with a load.

5. The device according to claim 1, wherein the output circuit comprises a transformer having a primary winding and a secondary winding, the primary winding being connected in series with the converter and the capacitive impedance, and the secondary winding being coupled to a load.

6. The device according to claim 5, wherein the output circuit further comprises a third rectifier means having AC input terminals and DC output terminals, the DC output terminals being shunted by a third capacitor and connected in parallel with the load.

7. An energy conversion device comprising an electronic converter adapted to deliver a high frequency unitary value signal whose envelope is influenced by the form of an input voltage, wherein one of the output terminals of the converter is common to one of its input terminals and its non common output terminal corresponds to the middle point of a series circuit formed by a switching means, the non common output terminal being isolated with respect to the DC current by means of a first capacitor, the first capacitor being connected to a series circuit formed by a current limiting inductor, an output circuit and a capacitive impedance, so that the voltage developed between the terminals of the capacitive impedance, applied to one of the AC input terminals of a first rectifier means, after rectification and filtering by a second capacitor, is added to the mains voltage rectified by a second rectifier means, the sum of these voltages being integrated between the terminals of a third capacitor thereby developing between the terminals thereof a DC voltage which is applied between the input terminals of the converter.

8. The device according to claim 7, further comprising a fourth capacitor connected between the AC input terminals of the first rectifier means and one of the terminals of the current limiting inductor, for providing, after rectification, the addition of a complementary voltage to the terminals of the second capacitor for linearizing the current taken from the mains as well as the voltage applied to the load.

9. The device according to claim 8, wherein the load is mounted in parallel with a winding coupled to the current limiting inductor, which is connected directly in series with the capacitive impedance, the fourth capacitor being connected to a suitably chosen intermediate tapping of the current limiting inductor.

* * * * *